United States Patent
Hong

(10) Patent No.: US 7,519,765 B2
(45) Date of Patent: Apr. 14, 2009

(54) METHOD OF DOWNLOADING MAIN CODE TO FLASH MEMORY

(75) Inventor: Soon-young Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 260 days.

(21) Appl. No.: 11/260,295

(22) Filed: Oct. 28, 2005

(65) Prior Publication Data

US 2006/0149894 A1  Jul. 6, 2006

(30) Foreign Application Priority Data

Jan. 4, 2005  (KR) .................... 10-2005-0000374

(51) Int. Cl.
  *G06F 12/00* (2006.01)
  *G06F 9/44* (2006.01)
  *G06F 9/445* (2006.01)

(52) U.S. Cl. .................. 711/103; 717/168; 717/169; 717/173; 717/174; 717/175

(58) Field of Classification Search .......... 711/103; 717/173, 168, 169, 174, 175
See application file for complete search history.

(56) References Cited

U.S. PATENT DOCUMENTS 5,937,198 A * 8/1999 Nelson et al. ............... 717/173
6,470,496 B1 * 10/2002 Kato et al. .................. 717/173
6,970,960 B1 * 11/2005 Sarfati ........................ 710/106
2004/0163112 A1 * 8/2004 Matula et al. ................ 725/50

FOREIGN PATENT DOCUMENTS

| JP | 10-40122 | 2/1998 |
|---|---|---|
| KR | 1999-0070535 | 9/1999 |
| KR | 2000-0003162 | 1/2000 |
| KR | 2000-0033437 | 6/2000 |

OTHER PUBLICATIONS

Korean Office Action issued on Jun. 10, 2006 with respect to Korean Application No. 10-2005-0000374, which corresponds to the above-referenced application.

* cited by examiner

*Primary Examiner*—Reginald G Bragdon
*Assistant Examiner*—Aracelis Ruiz
(74) *Attorney, Agent, or Firm*—Staas & Halsey LLP

(57) ABSTRACT

A method of downloading a main code to a flash memory is provided. The method includes: comparing the size of the buffer with the size of the flash memory and determining a number of stages or segments in which the main code is to be downloaded to the flash memory based on the comparison results; obtaining a plurality of sub-main codes by dividing the main code by the determined number; generating a plurality of flash loader codes corresponding to the sub-main codes; and downloading the sub-main codes to the flash memory using the flash loader codes. Accordingly, it is possible to use the entire storage capacity of the flash memory even when the flash memory size is not smaller than the buffer size.

9 Claims, 5 Drawing Sheets

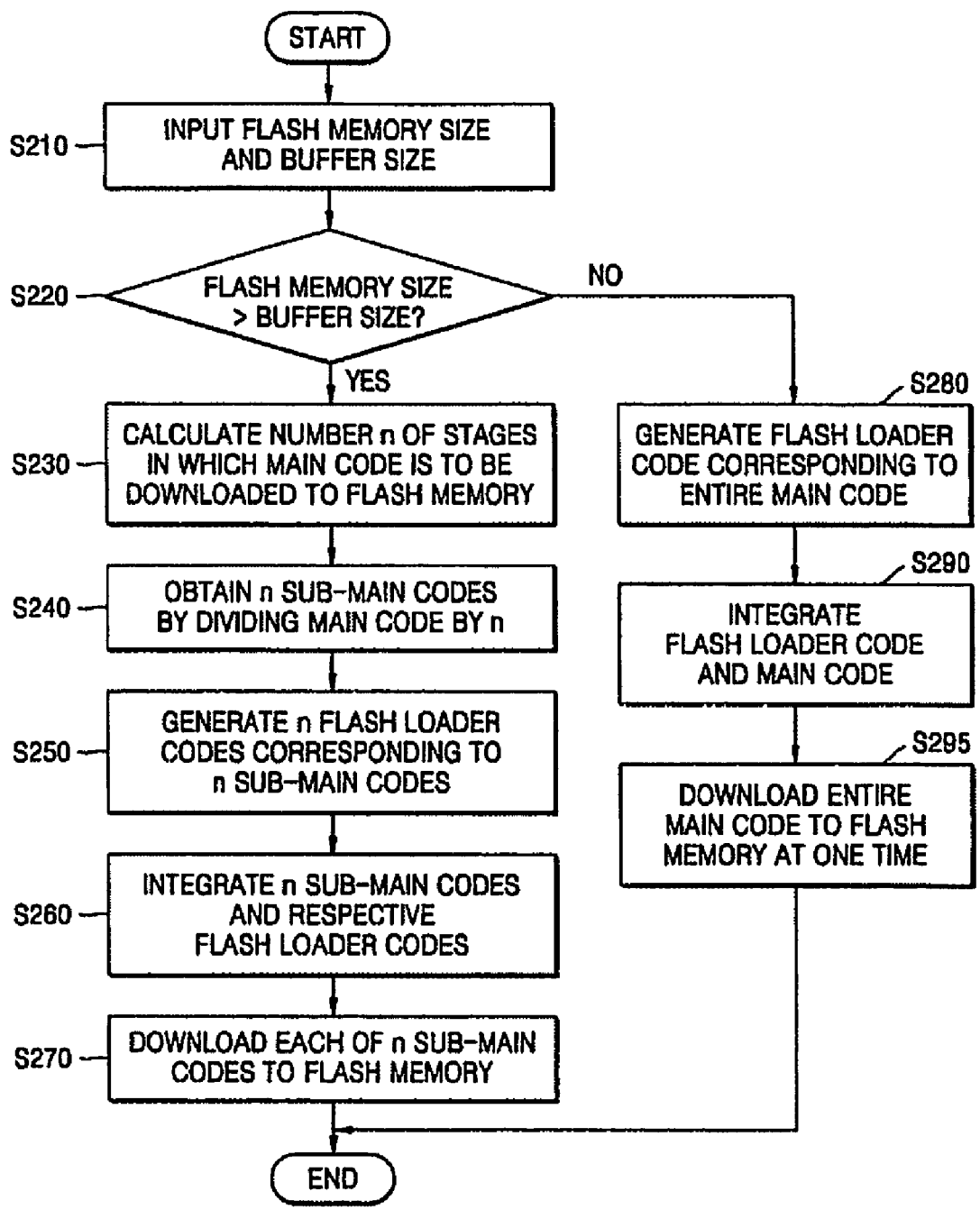

METHOD OF DOWNLOADING MAIN CODE TO FLASH MEMORY

CROSS-REFERENCE TO RELATED APPLICATION

This application claims the benefit of Korean Patent Application No. 10-2005-0000374, filed on Jan. 4, 2005, in the Korean Intellectual Property Office, the disclosure of which is incorporated herein in its entirety by reference.

BACKGROUND OF THE INVENTION

1. Field of the Invention

The present invention relates to a method of downloading a main code to a flash memory and, more particularly, to a method of downloading a main code to a flash memory, which divides a main code into a plurality of portions and downloads the portions of the main code to a flash memory 2. Description of the Related Art In general, ROMs are nonvolatile memories which are not erased even when turned them off. ROMs include a mask ROM, which is programmed by a manufacturer, and an electronically erasable programmable read-only memory (EEPROM), which is electronically programmable and erasable repeatedly.

A flash memory is an improved version of an EEPROM. The flash memory is erasable at one time or in a plurality of stages in units of blocks or sectors or in units of bits of a program stored therein. The structure of the flash memory is similar to the structure of a disc-type auxiliary memory device, which is divided into a plurality of sectors and formatted in units of the sectors.

A main code is downloaded to the flash memory. The main code enables the flash memory to perform printed circuit board (PCB) operations. Here, the PCB operations are basic operations that are performed in the flash memory when the flash memory is turned on, such as a test operation.

FIGS. 1A through 1C are diagrams illustrating a conventional method of downloading a main code to a flash memory. Referring to FIG. 1A, a main code 120 and a flash loader code 110 are integrated into an integration code 130. The flash loader code 110 is a code needed for writing the main code 120 to a flash memory 150.

Referring to FIG. 1B, the integration code 130 is downloaded to a buffer 140. Referring to FIG. 1C, the flash loader code 110 contained in the integration code 130 enables only the main code 120 to be downloaded to the flash memory 150.

In a conventional engine chip (CPU), a buffer is larger than a flash memory, and thus, a main code can be downloaded to the flash memory at one time using the conventional method of downloading a main code to a flash memory.

However, the conventional method of downloading a main code to a flash memory has a problem for an engine chip having a flash memory larger than a buffer. In other words, according to the conventional method of downloading a main code to a flash memory, it is impossible to use the entire storage capacity of a flash memory when an engine chip has a flash memory larger than a buffer.

SUMMARY OF THE INVENTION

Additional aspects and/or advantages of the invention will be set forth in part in the description which follows and, in part, will be apparent from the description, or may be learned by practice of the invention.

The present invention provides a method of downloading a main code to a flash memory, which divides a main code into a plurality of sub-main codes, generates a flash loader code for each of the sub-main codes, and downloads the sub-main codes to a flash memory.

According to an aspect of the present invention, there is provided a method of downloading a main code to a flash memory via a buffer to which the main code and a flash loader code are downloaded before downloading the main code to the flash memory. The method includes: comparing the size of the buffer with the size of the flash memory and determining a number of stages in which the main code is to be downloaded to the flash memory based on the comparison results; obtaining a plurality of sub-main codes or segments by dividing the main code by the determined number; generating a plurality of flash loader codes corresponding to the sub-main codes; and downloading the sub-main codes to the flash memory using the flash loader codes.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart illustrating a method of downloading a main code to a flash memory according to an exemplary embodiment of the present invention;

DETAILED DESCRIPTION OF THE PREFERRED EMBODIMENTS

Figure 1A:
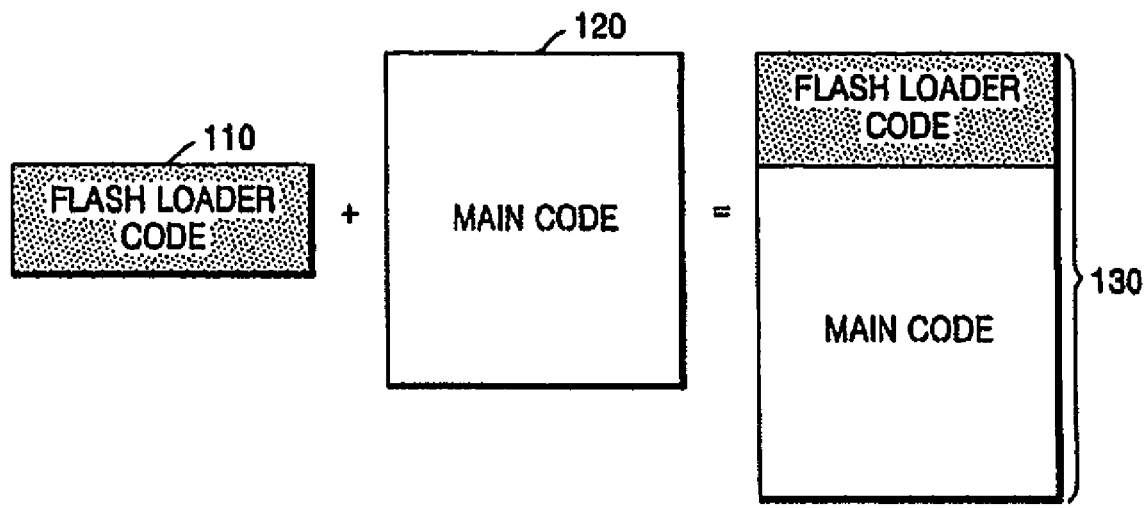
FIGS. 1A through 1C are diagrams illustrating a conventional method of downloading a main code to a flash memory.
Figure 1B:
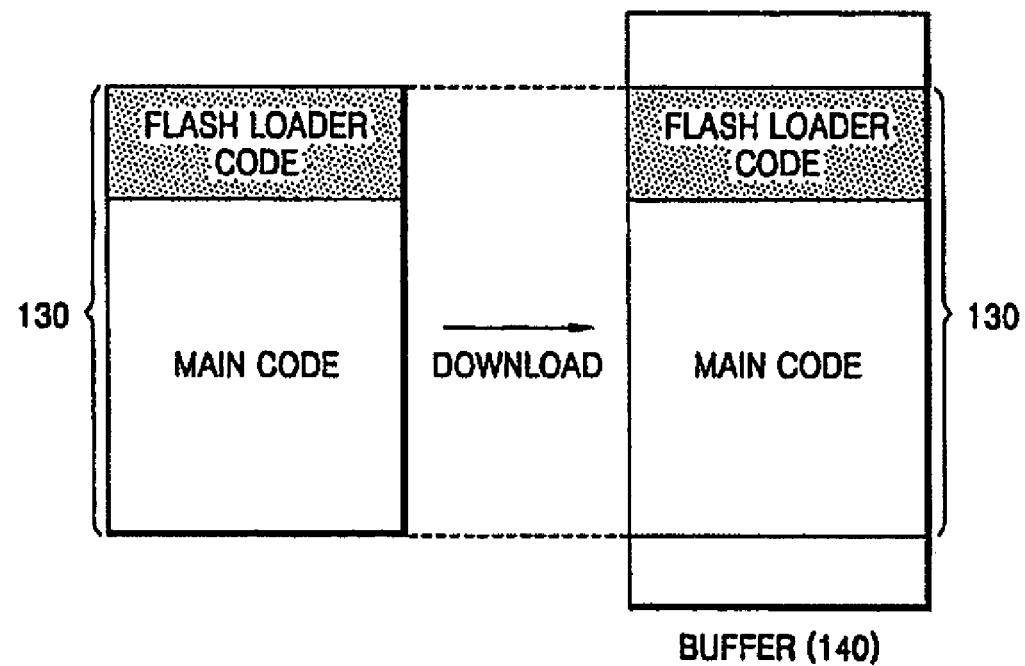
Figure 1C:
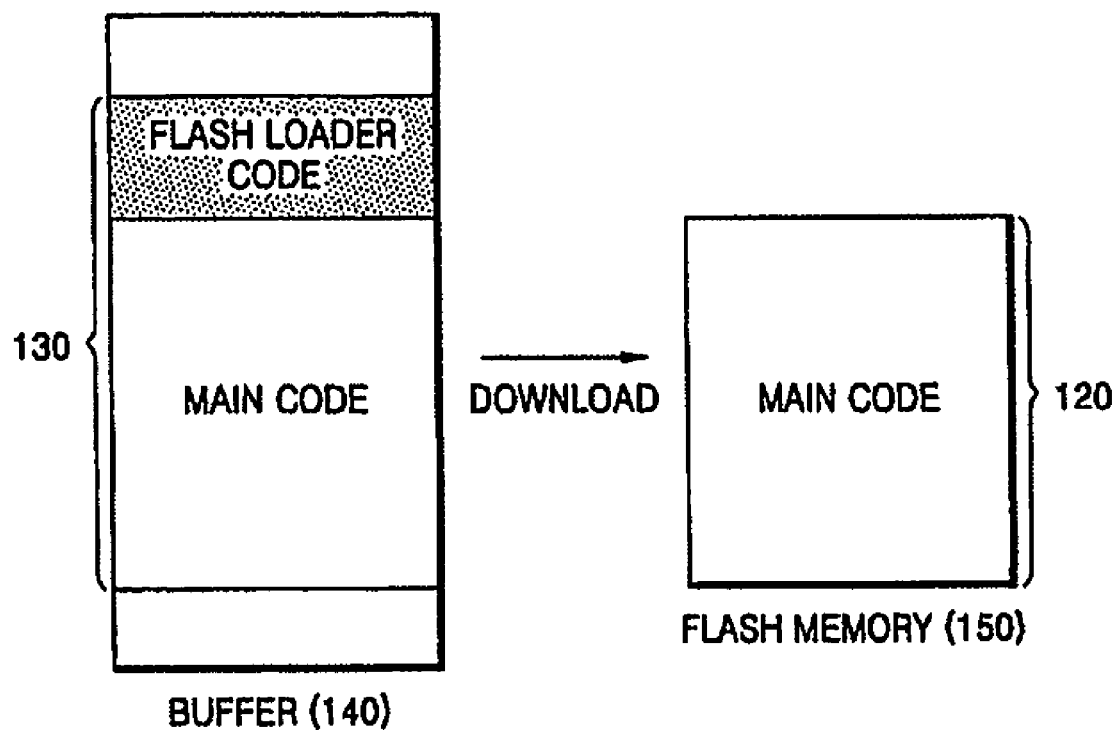

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings in which an exemplary embodiment of the invention are shown.

FIG. 2 is a flowchart illustrating a method of downloading a main code to a flash memory according to an exemplary embodiment of the present invention. Referring to FIG. 2, in operation S210, flash memory size and buffer size are input to a flash loader program by, for example, a user.

A flash memory and a buffer may be a flash memory and a buffer of an engine chip, such as a CPU. The flash loader program may be executed by a processor of the engine chip. The flash loader program is a computer program that downloads a main code to the flash memory by generating a flash loader code.

In operation S220, the flash loader program compares the flash memory size with the buffer size. In operation S230, if the flash memory size is not smaller than the buffer size, the flash loader program determines a number n of stages in which the main code is to be downloaded where n is an integer obtained by dividing the flash memory size by the buffer size.

In operation S240, the flash loader program divides the main code by n.

Figure 3A:
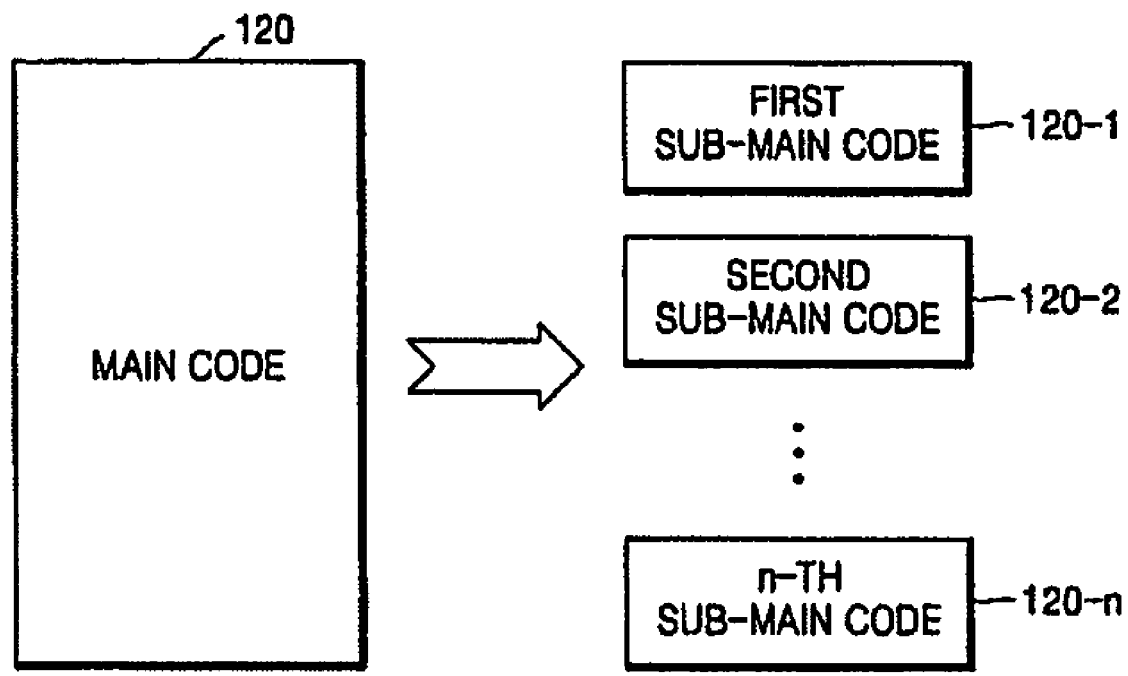
FIG. 3A is a diagram illustrating a process of dividing a main code into a plurality of sub-main codes.

FIG. 3A is a diagram illustrating a process of dividing a main code 120. Referring to FIG. 3A, the main code 120 is divided by n, thereby obtaining n sub-main codes, i.e., a first sub-main code 120-1, a second sub-main code 120-2, . . . , and an n-th sub-main code 120-n.

Referring to FIG. 2, in operation S250, the flash loader program generates a flash loader code for each of the n sub-main codes. As a result, a first flash loader code, a second flash loader code, . . . , and an n-th flash loader code are generated for the first sub-main code 120-1, the second sub-main code 120-2, . . . , and the n-th sub-main code 120-n, respectively.

The first through n-th flash loader codes may be identical or different from one another. The flash loader program generates the first through n-th flash loader codes through compilation.

In operation S260, the flash loader program integrates the first through n-th flash loader codes, respectively, and the first through n-th sub-main codes 120-1 through 120-n, respectively.

Figure 3B:
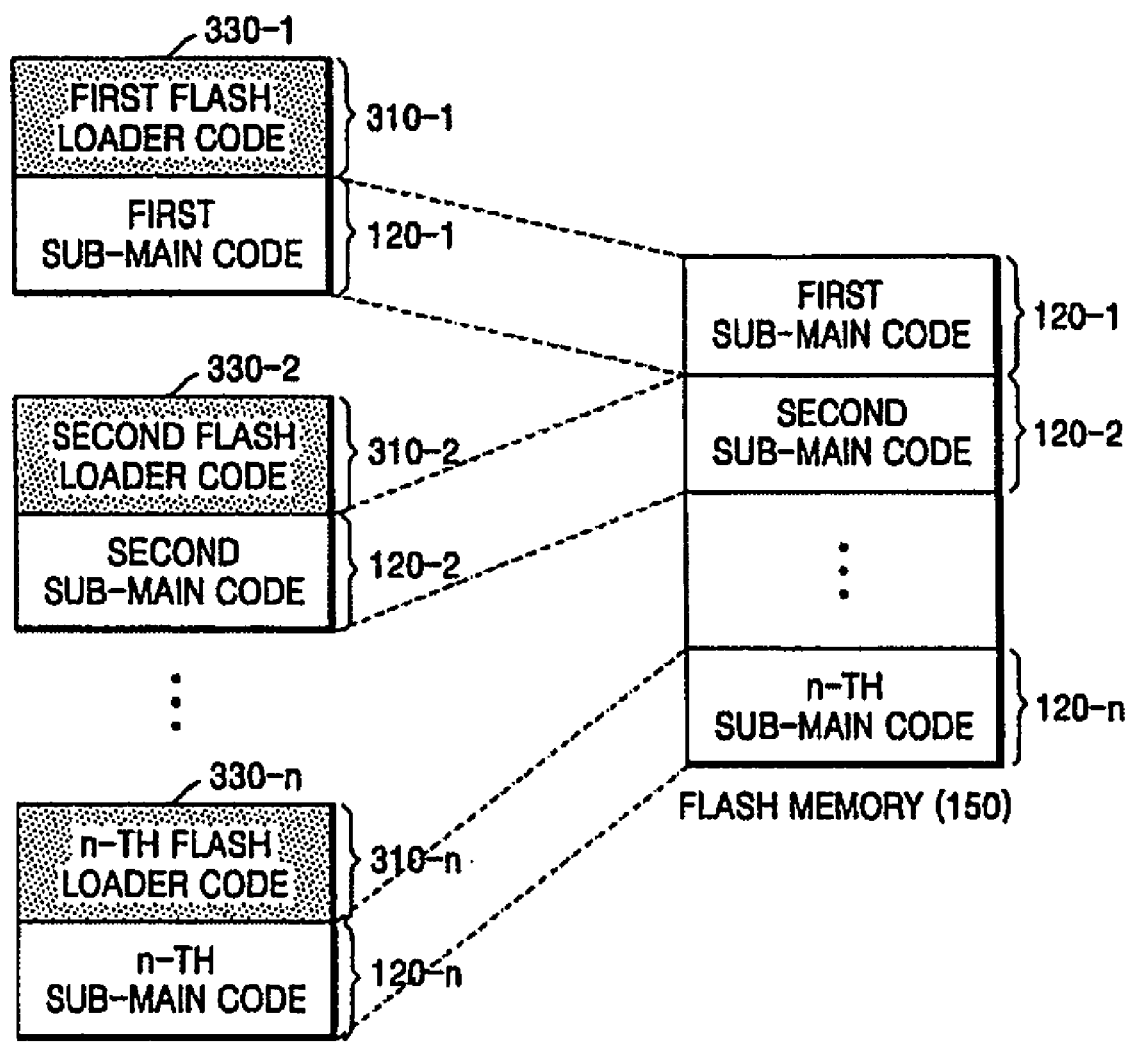
FIG. 3B is a diagram illustrating a plurality of flash loader codes.

FIG. 3B is a diagram illustrating a plurality of flash loader codes, i.e., first through n-th flash loader codes 330-1 through 330-n corresponding to the first through n-th sub-main codes 120-1 through 120-n, respectively, of FIG. 3A. Referring to FIG. 3B, the first sub-main code 120-1 and the first flash loader code 310-1 are integrated into a first integration code 330-1, the second sub-main code 120-2 and the second flash loader code 310-2 are integrated into a second integration code 330-2, and the n-th sub-main code 120-n and the n-th flash loader code are integrated into an n-th integration code 330-n.

Referring to FIG. 2, in operation S270, the first through n-th flash loader codes help the respective sub-main codes to be downloaded to the flash memory.

A method of downloading the first through n-th sub-main codes 120-1 through 120-n to a flash memory 150 using the first through n-th flash loader codes 310-1 through 310-n will now be described in detail with reference to FIG. 3B.

Referring to FIG. 3B, a flash loader program downloads the first integration code 330-1 to a buffer of the flash memory 150. The first flash loader code 310-1 in the first integration code 330-1 helps the first sub-main code 120-1 in the first integration code 330-1 to be downloaded to the flash memory 150.

When the downloading of the first sub-main code 120-1 to the flash memory 150 is complete, the flash loader program downloads the second integration code 330-2 to the buffer of the flash memory 150. Then, the second flash loader code 310-2 in the second integration code 330-2 helps the second sub-main code 120-1 in the second integration code 330-2 to be downloaded to the flash memory 150.

In this manner, the flash loader program sequentially downloads the rest of the first through n-th sub-main codes 120-1 through 120-n to the flash memory 150. Addresses of the flash memory 150 at the second through n-th sub-main codes 120-1 through 120-n are downloaded are automatically determined.

Specifically, the location in the flash memory 150 where the first sub-main code 120-1 is downloaded may be determined by a user. However, the locations in the flash memory 150 where the second through n-th sub-main codes 120-2 through 120-n are sequentially downloaded are automatically set when the second through n-th flash loader codes 310-2 through 310-n are generated.

For example, the second sub-main code 120-2 may be downloaded to the flash memory 150 under the first sub-main code 120-1, the third sub-main code 120-3 may be downloaded to the flash memory 150 under the second sub-main code 120-2, and the n-th sub-main code 120-n may be downloaded to the flash memory 150 under the (n−1)-th sub-main code 120-(n−1).

Accordingly, the first through n-th sub-main codes 120-1 through 120-n can be sequentially downloaded to the flash memory 150 without the need to designate where in the flash memory 150 they should be downloaded.

Referring to FIG. 2, in operation S280, if the flash memory size is not larger than the buffer size in operation S220, the flash loader program generates a flash loader code corresponding to the entire main code. In operation S290, the flash loader program integrates the flash loader code and the main code into an integration code.

The flash loader program downloads the integration code to the buffer of the flash memory. In operation S295, the flash loader code contained in the integration code helps the main code to be downloaded to the flash memory. Accordingly, the entire main code is downloaded to the flash memory at one time.

The present invention can be realized as a computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be easily deduced by one of ordinary skill in the art.

As described above, according to the present invention, if flash memory size is not smaller than buffer size, a main code is divided into a plurality of sub-main codes, and a plurality of flash loader codes corresponding to the sub-main codes are automatically generated. Accordingly, even though the flash memory size is not smaller than the buffer size, it is possible to use the entire storage capacity of the flash memory by downloading the sub-main codes to the flash memory. In addition, there is no need to manually compile each of the flash loader codes.

According to the present invention, locations in the flash memory where the sub-main codes are downloaded are automatically determined, and the flash loader codes enable the respective sub-main codes to be automatically downloaded at the determined locations. Accordingly, there is no need to manually set the locations in the flash memory where the sub-main codes are downloaded.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of
downloading a main code to a flash memory via a buffer to which the main code and a non-interpretative flash loader code are downloaded before downloading the main code to the flash memory, the method comprising:

generating a plurality of non-interpretative flash loader codes corresponding to sub-main non-interpretative codes; and downloading the sub-main non-interpretative codes to the flash memory using the non-interpretative flash loader codes.

2. The method of claim 1, further comprising:

comparing the size of the buffer with the size of the flash memory and determining a number of stages in which the main code is to be downloaded to the flash memory based on the comparison results; and obtaining a plurality of sub-main codes by dividing the main code by the determined number.

3. The method of claim 2, wherein the determined number is an integer obtained by dividing the flash memory size by the buffer size.

4. A method of claim 2, further comprising:

generating a non-interpretative flash loader code corresponding to an entire main code if the comparison result, buffer size is greater than the flash memory size;

integrating the non-interpretative flash loader code and the entire main code; and downloading the entire main code to the flash memory using the non-interpretative flash loader code.

5. The method of claim 1, wherein the non-interpretative flash loader codes are identical.

6. The method of claim 1, wherein the non-interpretative flash loader codes are different from one another.

7. A method of downloading a main code to a flash memory via a buffer to which the main code and a non-interpretative flash loader code are downloaded before downloading the main code to the flash memory, the method comprising:

generating a plurality of non-interpretative flash loader codes corresponding to sub-main non-interpretative codes; and downloading the sub-main non-interpretative codes to the flash memory using the non-interpretative flash loader codes, wherein the downloading of the non-interpretative sub-main codes to the flash memory comprises:

(a) downloading one of the non-interpretative sub-main codes and a corresponding non-interpretative flash loader code to the buffer;

(b) downloading the non-interpretative sub-main code downloaded to the buffer to the flash memory using the corresponding non-interpretative flash loader code; and (c) downloading the rest of the non-interpretative sub-main codes to the flash memory by repeatedly performing (a) and (b).

8. A computer-readable storage for controlling a computer and storing a method of downloading a main code to a flash memory via a buffer to which the main code and a non-interpretative flash loader code are downloaded before downloading the main code to the flash memory, the method comprising:

comparing the size of the buffer with the size of the flash memory and determining a number of stages in which the main code is to be downloaded to the flash memory based on the comparison results;

obtaining a plurality of non-interpretative sub-main codes by dividing the main code by the determined number;

generating a plurality of non-interpretative flash loader codes corresponding to the non-interpretative sub-main codes; and downloading the non-interpretative sub-main codes to the flash memory using the non-interpretative flash loader codes.

9. A method, comprising determining whether a main code and a non-interpretative flash loader code will fit in a flash memory loading buffer;

loading the main code into a flash memory when the main code and non-interpretative flash loader code will fit in the loading buffer; and loading the main code into the flash memory as segments when the main code and non-interpretative flash loader code will not fit in the loading buffer.

* * * * *